United States Patent

[11] 3,576,225

| [72] | Inventor | Henry B. Chambers |
| | | Santa Barbara, Calif. |
| [21] | Appl. No. | 791,246 |
| [22] | Filed | Jan. 15, 1969 |
| [45] | Patented | Apr. 27, 1971 |
| [73] | Assignee | Hydranautics |

[54] APPARATUS FOR MOVING MULTITON OBJECTS
10 Claims, 17 Drawing Figs.

| [52] | U.S. Cl. | 180/8 |
| [51] | Int. Cl. | B62d 57/02 |
| [50] | Field of Search | 180/8, 8 |
| | | (.3), 8 (.7) |

[56] References Cited
UNITED STATES PATENTS

| 1,615,055 | 1/1927 | Turner | 180/8.3 |
| 2,800,970 | 7/1957 | Barret | 180/8.3 |
| 3,114,425 | 12/1963 | Adams | 180/8.3 |
| 3,135,345 | 6/1964 | Scruggs | 180/8.7 |
| 3,249,168 | 5/1966 | Klein et al. | 180/8.3 |

*Primary Examiner*—Leo Friaglia
*Attorney*—Spensley and Horn

ABSTRACT: A module and system for use in connection with the moving of multiton objects over a ground surface containing no rails. The modular concept permits moving heavy loads which are dimensionally large and which are not rigid enough to be supported at a few points. It also enables objects which vary in size and shape to be moved.

HENRY B CHAMBERS
INVENTOR.

BY Spensley & Horn

ATTORNEYS

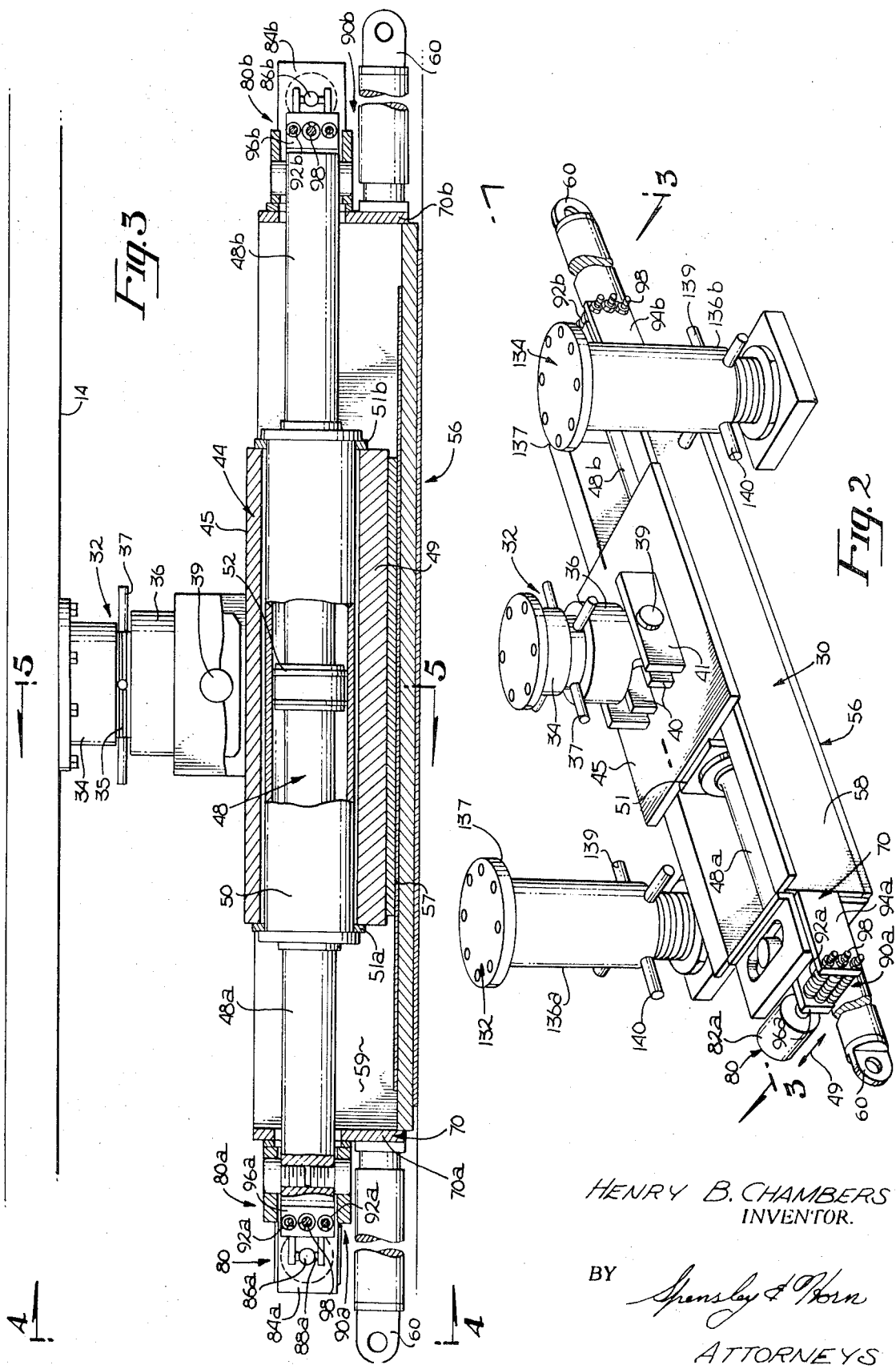

PATENTED APR 27 1971 3,576,225

HENRY B. CHAMBERS
INVENTOR.

BY
Spensley & Horn
ATTORNEYS

HENRY B. CHAMBERS
INVENTOR.

BY Spensley & Horn
ATTORNEYS

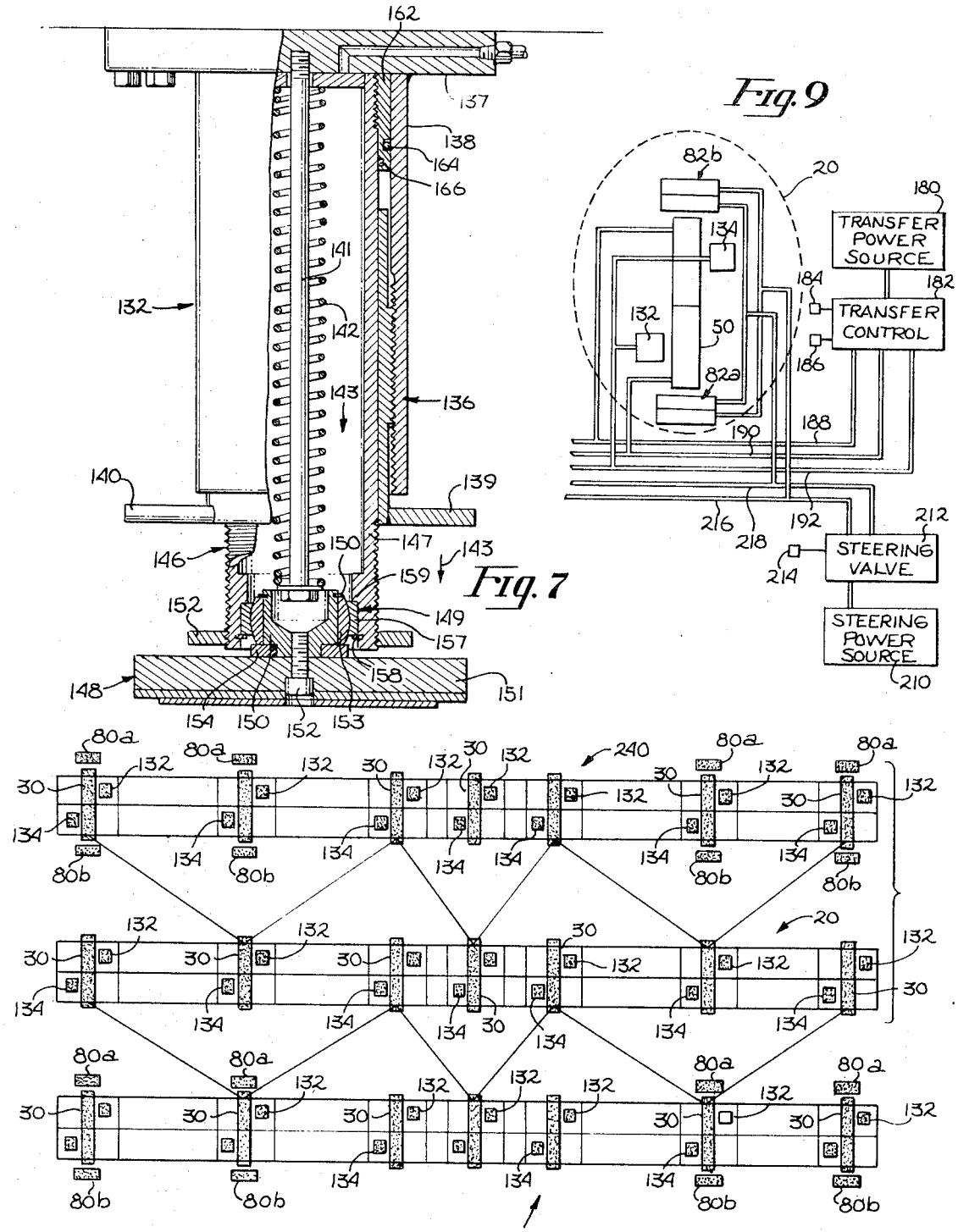

HENRY B. CHAMBERS
INVENTOR.

BY Spensley & Horn
ATTORNEY

APPARATUS FOR MOVING MULTITON OBJECTS

BACKGROUND OF THE INVENTION

1 Field of the Invention

This invention relates to an apparatus for moving heavy objects.

2 Prior Art

There are numerous types of systems that have been developed for moving heavy loads. Typically, these devices are designed for a particular application such as mining, earthmoving or derrick movement such as shown in U.S. Pats. Nos. 1,879,446; 2,660,253 and 2,800,970. As a result of this inclination to build a system to solve a particular problem, the systems developed, while perhaps suitable for the particular application, have been very limited in general application. The prior art systems have not been adaptable to move multiton objects having a broad range of sizes, weights, shapes and construction. Thus, there is a lack of generality existing in prior art systems.

Other systems for moving multiton objects have involved the use of rails. The use of rails immediately limits the flexibility of movement possible, that is, the object may only be transferred where the rails exist. One approach to solving this problem has been to employ movable rails. This, in part, solves the problem but it is inconvenient and slow as it requires considerable labor to regularly change the position of the rails. In addition, the weight bearing capacity of rails and/or wheels is limited or quite expensive. For example, the movement of loads in the order of 10,000 tons to 50,000 tons requires very expensive wheel and rail arrangement, that is of the order of approximately 2—5 times as expensive as the system disclosed herein.

Recognizing the above problems with wheels, many of the (steerable) very heavy load-moving apparatus have resorted to systems employing flat ground contacting surfaces capable of adequately distributing the load and moved by some type of cylinder arrangement. One of the more difficult problems with such systems is steerability and control, since wheel-type vehicle steering is no longer applicable. In general, the arrangements to solve this problem have been cumbersome, expensive, nonexpandable and of limited generality.

BRIEF DESCRIPTION OF THE INVENTION

It is the purpose of this invention to solve the general problems set forth in the preceding section and to solve other specific problems which will be understood from the detailed description which follows. Specifically, it is the purpose of the invention to provide a system and module which may generally be applied to solve the problem of moving multiton objects and which system may handle objects of varying size, weight, shape and construction. The invented module and system are also capable of movement over a ground surface without rails or other irregular supporting structures. The invented system is capable of moving over and being steerable over a ground surface by relatively simple means. The steering means is capable of steering such loads with a positional accuracy of under 1 inch.

The invention to accomplish the above employs a module including a hydraulic vertical support means for selectively supporting the multiton object and a hydraulic moving and support means for selectively and alternately supporting the multiton object and for moving the multiton object over the ground surface. To form a system each module is connected to an adjacent module which is substantially identical for interchangeability. The steering mechanism is such that the addition of modules does not disturb or alter the control means for steering, as the control means for steering may be common to any number of modules and thus truly expandable.

It should be understood that the above is only a very general outline of the invention and specific invented features will be understood from the detailed description which follows.

BRIEF DESCRIPTION OF THE DRAWINGS

Referring to the drawings:

FIG. 2 is a perspective view of the vertical support means and the hydraulic moving and support means;

FIG. 3 is a frontal section view taken along the lines of 3–3 of FIG. 2 showing the horizontal moving and support means;

FIG. 7 is a sectional view of the vertical support means taken along the lines 7–7 of FIG. 4;

FIG. 8 is a schematic diagram of a number of modules arranged into a system;

FIG. 9 is a hydraulic schematic for a part of the system shown in FIG. 8; and,

DETAILED DESCRIPTION OF THE INVENTION

Figure 1A:
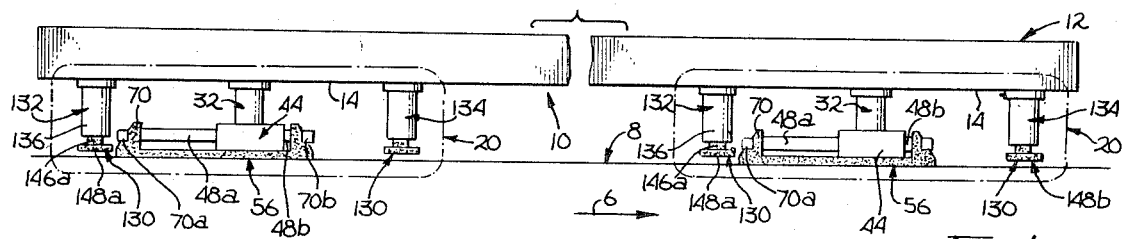
FIGS. 1a through 1e is a diagrammatic showing of an embodiment of the invention in various positions as the system moves through one cycle of operation.

Before the detail construction of an embodiment of the invention is described, it will be helpful to generally describe the system aspect of the invention in a more general form. This should help to make the detail structural description more meaningful. Such a general description can be readily understood by reference to FIG. 1a through 1e, wherein a simplified pallet 10 is shown comprising a support surface 12 and having a plurality of modules or jacking group means 20 attached to underside 14. Each module 20 includes a hydraulic moving and support means or horizontal jacking assembly 30 and a vertical support means or jacking assembly 130. The embodiment shown in FIG. 1 employs a vertical support means 130 having two vertical jacking assemblies 132 and 134, which are substantially identical in construction but spaced on opposite sides of horizontal jacking assembly 30 (FIG. 2). Of course, it is within the scope of the invention to employ two horizontal jacking assemblies and/or one or more vertical jacking assemblies to obtain the necessary support and balance (FIG. 10). In addition, it may be possible to employ a single vertical jack and a single horizontal assembly, but in general, it is preferred that at least three units (total number of vertical and horizontal jacking assemblies) per module be employed to obtain balance, module stability and interchangeability. In addition, for larger objects at least three modules would be employed for pallet system stability and commonly four modules would be employed. A number of pallet systems may be joined to form a pallet assembly to move huge objects such as portions of ships.

The horizontal jacking assembly 30 is attached to the underside 14 of pallet 10 by a movable pedestal connection means 32 that is rigidly attached to cylinder housing 44. Cylinder housing 44 has a hydraulic cylinder (not shown) fixed therein and is also in sliding and bearing abutment with load and bearing means 56. The cylinder (not shown) within cylinder housing 44 is fixed to the housing and moves therewith. It can be seen that with the components in the position as shown in FIG. 1a, when a multiton object is placed on pallet 10, the load is transferred to the ground surface 8 via pedestal connection 32, cylinder housing 44 and load and bearing means 56. Thus, in this position, the horizontal jacking assembly 30 serves to support pallet 10 and any load thereon.

The load and bearing means 56 is rigidly connected to end plate means 70 which has steering means 80 attached thereto. It should be noted that there is an end plate 70 and a steering means 80 at each end of load and bearing means 56. It should be understood that the end plate means may take the form of various different configurations as well as the steering control means and that at least one specific embodiment and configuration will be disclosed later in the specification. For the purposes of the description which follows, substantially identical components will be identified with the same numerals but those at the left end of the module in FIG. 1 shall carry a subscript "a" and those at the right end of the module shall carry a subscript "b."

The steering control means $80_a$ and $80_b$ are fixed to the end plates $70_a$ and $70_b$ and are connected to the piston rods $48_a$ and $48_b$ for displacing the piston rods in a direction substantially perpendicular to the axis of the piston rods (laterally) as indicated by the arrows 49 in FIG. 2. It should be understood that it is within the scope of this invention to employ only a single steering means 80 on one end plate means 70 and to have the other end of piston rod 48 movable or pivotally mounted in the other end plate means 70. Thus, the steering means 80 may be operated to laterally move piston rod 48 in end plates 70 or to pivotally move piston rod 48 by laterally displacing one end of the piston rod and pivoting the other end of the piston rod. It is also possible to use a combination of these approaches by having one steering control means laterally displace the end of piston rod 48 in one direction while the other control means 80 attached to the other end plate 70 displaces the opposite end of piston rod 48 in the opposite direction. This would create a pure torque action with a pivot point intermediate the piston rod. The piston rods $48_a$ and $48_b$ are continuous having a piston intermediate said rods mounted in the cylinder (FIG. 3).

It can now be seen that bearing means 56, end plates $70_a$ and $70_b$, steering means $80_a$ and $80_b$, and piston rods $48_a$ and $48_b$ along with the piston form a connected or substantially unitary structure (referred to as a slide) which may be moved as a unit by operating the cylinder within cylinder housing 44. It is also possible, within the slide, to displace the piston rods $48_a$ and $48_b$ with respect to the end plates 70 (provided the horizontal jacking assembly 30 has been operated).

The primary remaining portion of module 20 is vertical support means 130 which comprises in the embodiment shown two vertical jack assemblies 132 and 134 (FIG. 1). In essence, these jacking assemblies comprise an outer cylinder means 136 and an inner cylinder or ram means 146 which acts as a piston (or part thereof) and a piston rod and is connected to vertical assembly baseplate means 148. The inner cylinder means 146 is normally deenergized in the position as indicated in FIG. 1a with the vertical baseplate 148 removed from ground surface 8. When hydraulic pressure is applied, inner cylinder means 146 is extended and baseplate 148 contacts the ground. The further extension of the inner cylinder means 146 results in a lifting of the pallet 10 and a removal of load and bearing means 56 from ground surface 8. Thus, vertical support means 130 functions, when operated, to selectively support pallet 10 and any object thereon and simultaneously remove horizontal jacking assembly 30 from contact with ground surface 8.

Figure 1B:
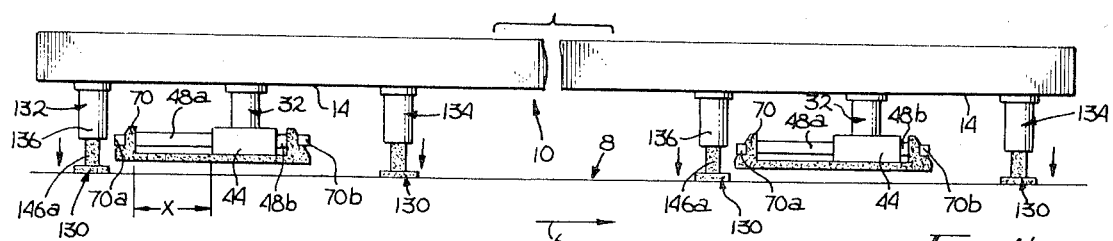

From the above-described general structure, it is now possible to explain certain system aspects of the of the invention shown in FIG. 1a—e. In FIG. 1a, the modules are shown with the vertical support means 130 retracted and the horizontal jacking assembly 30 in contact with ground surface 8. The slide is located in its leftmost position relative to cylinder housing 44. All of the modules connected to pallet 10 are in the same condition. (The modules shown in FIG. 1 interconnected via the pallet. It is, of course, within the scope of the invention in addition to the pallet connection to have a direct mechanical linkage between the end plates or other components on various modules.) With the modules in the condition shown in FIG. 1a, pallet 10 and any object thereon is supported by the horizontal jacking assembly via pedestal connection 32, cylinder housing 44 and bearing means 56. To move in the direction of arrow 6 (FIG. 1b,) vertical support means 130 is first extended by moving inner cylinders $146_a$ and $146_b$ as shown in FIG. 1b, whereby vertical baseplates $148_a$ and $148_b$ contact ground surface 8. As cylinders $146_a$ and $146_b$ continue to extend, bearing means 56 is lifted slightly above ground surface 8. Now vertical support means 130 functions to support pallet 10 and any object thereon.

Figure 1C:
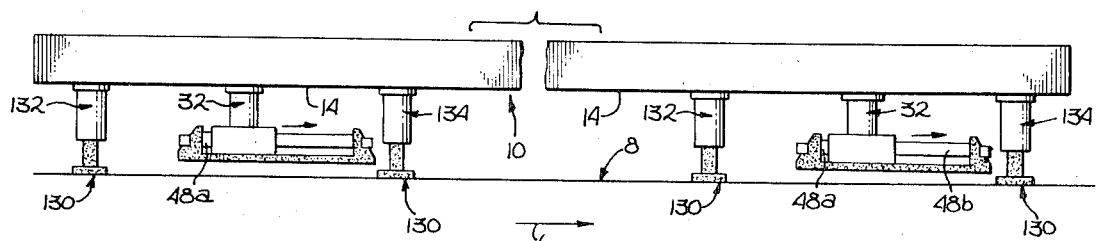

Next, the cylinder within housing 44 is operated so that piston rods $48_a$ and $48_b$ are moved in the direction of arrow 6 along with the attached end plates $70_a$ and $70_b$ and bearing means 56 while cylinder housing 44 and the cylinder therein remain in a fixed position. This results in end plate $70_a$ being moved closely adjacent cylinder housing 44 as shown in FIG. 1c. During this movement, bearing means 56 is removed from the ground surface 8 so that movement is readily accomplished with respect to the ground. Typically, the distance "X" of such movement may be a few inches to in excess of 30 inches.

Figure 1D:
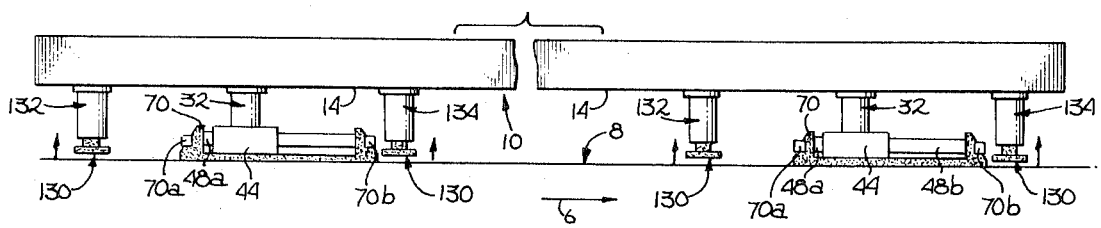

With the slide in its rightmost position (FIG. 1c) with respect to cylinder housing 44 and the cylinder therein, vertical support means 130 is retracted so that bearing means 56 again contacts ground surface 8 thereby transferring the load on pallet 10 to ground surface 8 via pedestal connection 32, housing 44 and bearing means 56. This simultaneously fixes bearing means 56 along with end plates 70 to ground surface 8 as shown in FIG. 1d. Now a proper pressurizing of the cylinder within cylinder housing 44 will result in the cylinder housing 44 along with the cylinder therein, pedestal connection 32, pallet 10 and the load thereon moving in the direction of arrows 6. During this movement, the cylinder housing 44 slides over bearing means 56.

When the forces developed by the cylinder with cylinder housing 44 are sufficient to overcome the static friction forces, it will be seen that steering may be readily accomplished by the application to the piston rods 48 of lesser lateral forces. Thus, if it is the desire to steer the pallet 10 in a lateral direction as indicated by the arrows 49 in FIG. 2, substantially simultaneously with the application of the cylinder pressure necessary to move the cylinder housing 44, etc., a lateral force is applied to the ends of piston rods $48_a$ and $48_b$ causing the pallet 10 and any object thereon to be translated laterally on bearing means 56 and in effect steered. In a typical system with relatively large multiton loads (e.g., over 1,000 tons), it is possible with relatively small forces (e.g., less than one-thirtieth of the forces developed by the cylinder within cylinder housing 44) to move in a lateral direction in excess of one-fourth inch for each foot of travel in the direction of arrow 6. In one example of the system, movement in the direction of arrow 6 may be approximately 30 inches for each cycle while movement in the lateral direction is approximately 1 inch for each cycle. (It is within the broad scope of the invention to employ a larger cylinder acting on piston rod 48 and a smaller one within housing 44).

Figure 1E:
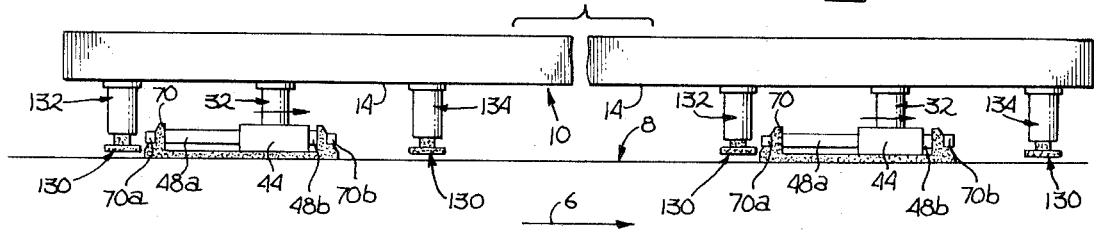

It can be seen that the system as shown in FIG. 1e has completed a cycle of operation as the relationship of the components in FIG. 1e is substantially identical to that shown in FIG. 1a. A comparison of FIG. 1a and FIG. 1e shows that the pallet 10 has been moved in the direction of arrow 6. At this point, the operation sequence is again initiated.

From the above general description, it can be seen that a basic module 20 has been provided which is relatively simple in concept and capable of supporting and moving very heavy objects (e.g., ships) over surfaces without rails thereon. Further, the module may be steered with a relatively high degree of mobility. In addition, identical modules may be combined to increase the load-bearing capacity and thus move heavier objects or to move a larger sized object or to move objects having various shapes. The modules are substantially identical in construction and by merely adding the necessary conduits, the controls employed to steer one module may be employed to steer many modules. Thus, this system has great generality, interchangeability and application.

With the general module and system concept in mind, the particular elements and components which may be employed in a typical module and system will be described. It should, of course, be understood that while certain elements and components of the system described herein have particular advantages in themselves, there are many other alternate or different forms, details, configuration, and rearrangements which the components and elements may embody within the broad aspects of the invention.

Referring to FIG. 2, the horizontal jacking assembly 30 and the vertical jacking assembly 130 are shown in perspective with the relationship of vertical jacks 132 and 134 with respect to the horizontal jacking assembly 30 clearly shown. It should be noted that while the vertical jacks 132 and 134 are shown to be independent of the horizontal jacking assembly 30, in a typical system it may be desirable to attach the vertical jack assemblies 132 and 134 to plate 45 (FIG. 5) by a pin latch-type bar arrangement whereby the pin may readily be removed so that horizontal jack assembly 30 may be rotated 90° as indicated by the broken lines in FIG. 6. When the rotation of the horizontal jack assembly 30 is complete, then the pin again would be placed in position and the horizontal jack assembly 30 would be secured to the vertical jacks 132 and 134 in this newly oriented position. This reorientation of horizontal jack assembly 30 would usually be accomplished manually and would enable a 90° change in direction. It is possible to make this change by other than manually operated means and to arrange for changes lesser than or more than 90°. The horizontal jack assembly 30 and one means for accomplishing this rotation by manual means will be described in greater detail with respect to FIGS. 3, 4, 5 and 6.

Figure 4:
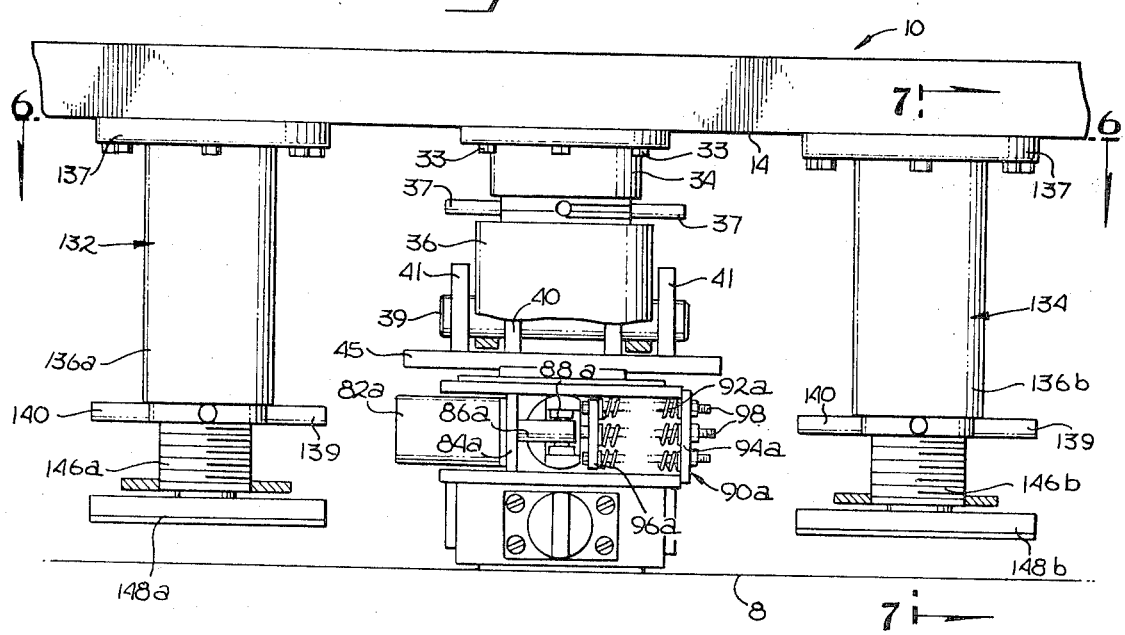
FIG. 4 is a left end view taken along the lines 4–4 of FIG. 3 showing the horizontal moving and support means along with the vertical support means.
Figure 5:
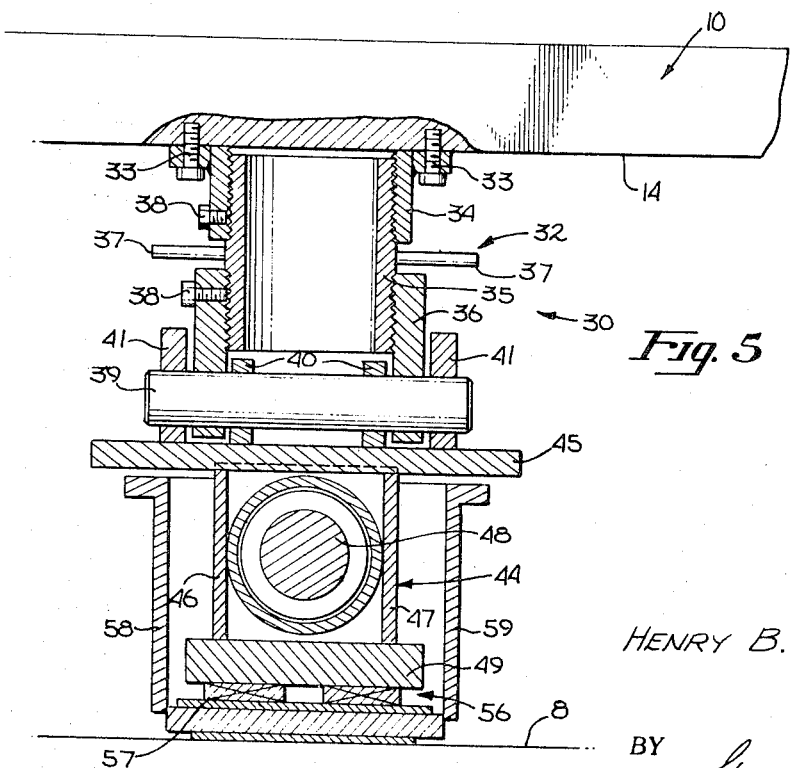
FIG. 5 is a side sectional view taken along the lines 5–5 of FIG. 3 showing part of the horizontal moving and support means in section.

Referring to FIGS. 3, 4, 5 and 6, horizontal jacking assembly 30 is rigidly attached to the pallet 10 by pedestal connection 32 which is shown in greatest detail in FIG. 5. The pedestal connection 32 includes fastening means such as bolts 33 which threadingly engage mounting flange 34 and the underside 14 of pallet 10. The mounting flange 34 is internally threaded and mates with an elevation adjustment collar 35 which facilitates elevation adjustment that cannot be accommodated by the vertical jacks alone. This collar 35 may be threaded left-hand on one end and right-hand on the other end in the fashion of a turnbuckle. The mounting flange 34 is threaded left-hand and a pivot fitting 36 threaded right-hand. The collar 35 may be rotated by handles 37. The rotation of elevation adjustment collar 35 will change the fixed elevation of the pallet 10 to provide accurate positioning over a number of inches for alignment with other modules. Once the proper elevational position is obtained, collar 35 is locked to both mounting flange 34 and pivot fitting 36 by locks 38 (schematically shown). One of these locks may be a 90° swivel lock so that when disengaged, it will permit the horizontal jack assembly 30 to be manually rotated (e.g., 90°) to change the direction of pallet movement. Thus, when the direction of movement of horizontal jack assembly 30 is to be changed a substantial predetermined amount (e.g., over 10°) only one of the locks need be open. Once the direction of horizontal jack assembly 30 is set, then both of the locks may be opened to permit elevation adjustment by the rotation of the elevation collar 35.

The pivot fitting 36 is connected to pivot pin 39 which is supported by inner pivot mount 40 and outer pivot mount 41. The pivot mounts 40 and 41 are rigidly attached to cylinder housing 44. Thus, pivot fitting 36, collar 35, and mounting flange 34 along with pallet 10 fixed thereto may pivot about pin 39. The purpose of this pivot connection is to accommodate nonparallelism between the pallet and ground surface 8 in the direction of pallet travel.

Figure 6:
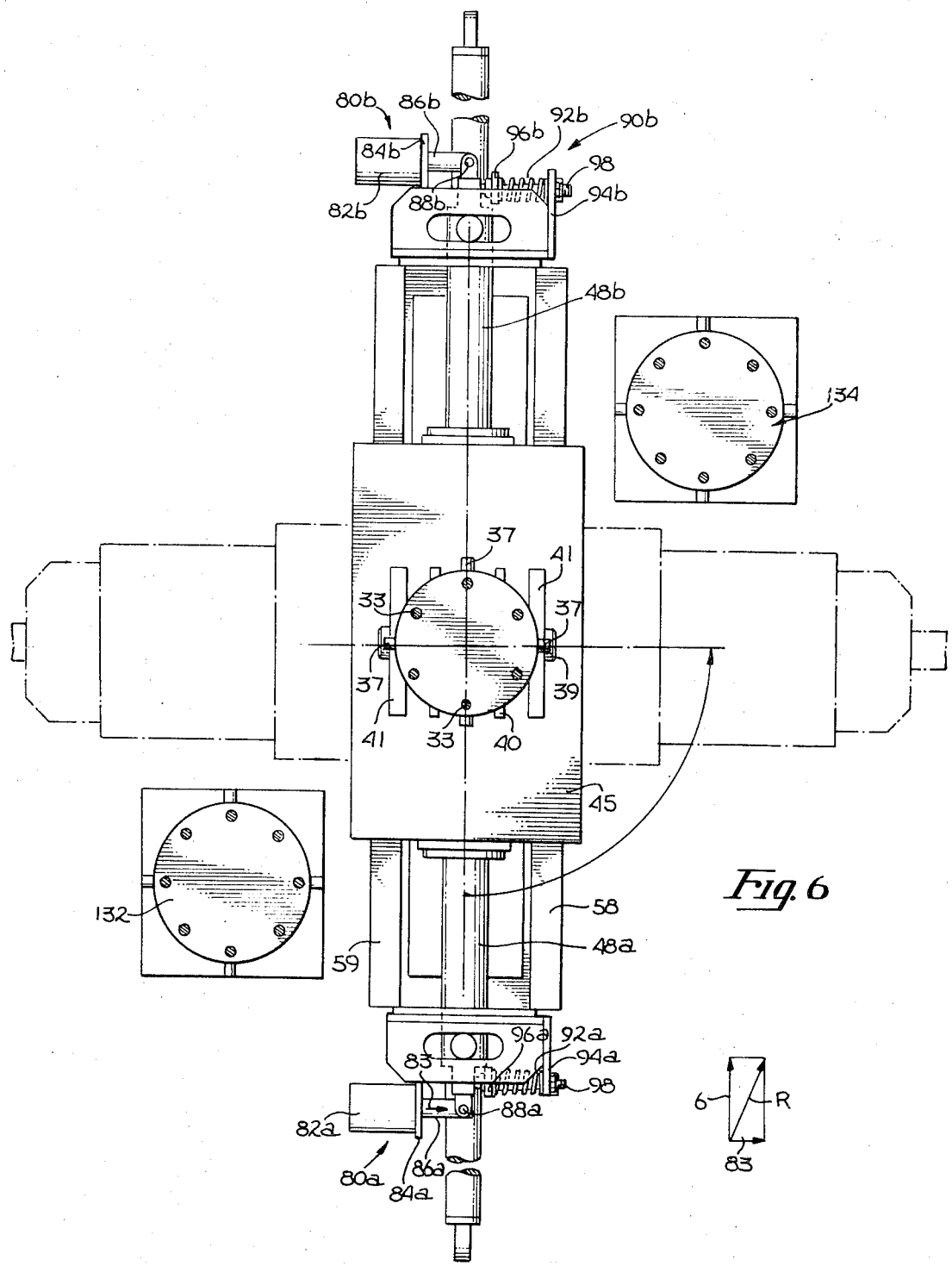
FIG. 6 is a plan view of the horizontal moving and support means in both an X and Y position and taken along lines 6–6 of FIG. 4.

The cylinder housing 44 is formed by plates 45, 46, 47 and 49, rigidly joined to form a structural member for transferring the load to bearing means 56 (FIG. 5). A cylinder 50 is fixed within housing 44 by retaining members 51$_a$ and 51$_b$ (FIG. 3). The cylinder 50 contains double ended piston rods 48$_a$ and 48$_b$ with piston 52 fixed thereto intermediate piston rods 48$_a$ and 48$_b$. Piston rods 48$_a$ and 48$_b$ are captured by the end plates 70$_a$ and 70$_b$ in a slot and coupled to steering means 80$_a$ and 80$_b$ (FIGS. 2, 3 and 6). The end plates 70$_a$ and 70$_b$ are in turn connected to bearing means 56 to form what has been referred to as the slide or a movable track.

Bearing means 56 is schematically shown as a series of laminated platelike members or layer which preferably includes one or more layers of urethane to accommodate dimensional errors in the concrete by elastic deformation and minor load redistribution (FIG. 5). In addition, a layer of urethane adjacent the ground surface 8 will protect the concrete from high unit loading at local high points. These layers of urethane are preferably built up on load distribution plate. In addition, a layer of dry lubricant may be employed at the interface 57 where the sliding takes place thereby minimizing friction and maintenance. The bearing means 56 is attached to outer housing plates 58 and 59 which form part of the slide plates 58 and 59 having steering means 80 mounted at ends thereof for interconnection to piston rods 48$_a$ and 48$_b$. (It should be understood that one of the layers of bearing means 56 may be fixed to the housing 44.) Bearing means 56 on different modules may be interconnected by a rod connection 60. This connection enables the different modules to act as a structured unit.

The steering means 80 is best shown in FIGS. 2 through 4 and 6. It should be understood that in the embodiment shown, identical steering means are located at both ends of outer housing plates 58, 59. It should be understood that the general principle of the steering mechanism may be attained by numerous other detail embodiments which fall within the broad scope of the invention. The more general steering principle is to provide steering by the exertion of a lateral force (that is, a force that is at a substantial angle, e.g., right angle, to the primary load-moving force) applied for at least a part of the period that the primary load-moving force is applied (that is, the force developed by cylinder 50, piston 52 and piston rods 48$_a$ and 48$_b$). More specifically, the steering concept includes the application of the lateral force to the piston rods. Preferably, the lateral force is exerted by some simple linear actuator means such as a hydraulic cylinder directly coupled to the piston rods. The steering hydraulic cylinder is substantially smaller in size than the cylinder 50, that is less than half the length of cylinder 50. It is within the broad scope of the invention to have the piston rods 48$_a$ and 48$_b$ moved by the later force of the steering means 80$_a$ and 80$_b$ with a resultant lateral movement, lateral and rolling movement, pivoting movement about one end of the horizontal jacking assembly, pivoting movement intermediate the end or a combination of such movements. In the embodiment shown in FIG. 6, piston rods 48$_a$ and 48$_b$ are translated laterally by both steering means 80$_a$ and 80$_b$ exerting a force in the same direction at the ends of piston rods 48$_a$ and 48$_b$. In certain forms of the invention, it is preferred to have one of the steering means at one end of the piston rod pushing while the steering means at the other end of the piston rod is pulling.

Specifically, the steering means 80$_a$ (which in this embodiment is substantially identical to 80$_b$) shown in FIGS. 2 through 4 and 6, includes a hydraulic cylinder 82$_a$ attached to outer housing plate 59 by suitable brackets 84$_a$ (FIGS. 4 and 6). The cylinder 82$_a$ may be single-acting or double-acting, but in the embodiment shown, it is a double-acting cylinder having a piston and a piston rod 86$_a$ which is connected to piston rods 48$_a$ by a pivotal connection 88$_a$. The piston rods 48$_a$ slides in a pin-slot connection with the slot in the end plate and the pin attached to piston rod 48. A spring assembly 90$_a$ is connected to piston rod 48$_a$ to oppose the extension of piston rod 86$_a$ in the direction indicated by arrow 83 (FIG. 6). The spring assembly 90$_a$ returns the piston rod 48$_a$ to a neutral position when cylinder 82$_a$ is not operated, and bearing means 56 is removed from ground surface 8. The spring assembly 90$_a$ comprises a plurality of springs 92$_a$ positioned between a pair of plates 94$_a$ and 96$_a$ by fastening means 98 (e.g., spring bolts). The plate 96$_a$ is mounted for sliding movement on fastening means 98 while the plate 94$_a$ is fixed to outer housing plate 58 by suitable brackets. The plate 96$_a$ is connected to piston rod $48_a$ so that movement of the piston rod in a lateral direction is transmitted to plate $96_a$ to slide the plate over fastening means 98 and compress the springs $92_a$ or permit the springs to expand depending upon the direction of movement of piston rod $48_a$. It is, of course, possible to eliminate plate $96_a$ and attach fastening means 98 directly to piston rod 48. The specific arrangement will, in large, depend upon the specific details and dimensions of components.

The operation of steering means 80 has, in general, been explained in connection with FIG. 1. Specifically, it will be recalled that steering is accomplished when the system components are in the position as indicated in FIG. 1d. In this situation, if movement to the right (in FIG. 6) is desired, the cylinders $82_a$ and $82_b$ would be operated to extend piston rods $48_a$ and $48_b$ being displaced in the direction of arrow 83 along with cylinder 50, cylinder housing 44, pedestal connection 32 and pallet 10 (FIGS. 1 and 6). This displacement would generally only occur after cylinder 50 was operated for movement such as indicated by arrow 6 (FIGS. 1 and 6). The resultant movement is indicated on the vector diagram of FIG. 6 by R. The movement of the piston rods $48_a$ and $48_b$ in the direction of arrow 83 compresses springs $92_a$ and $92_b$. When the vertical jacking assemblies 132 and 134 are operated to assume the position shown in FIG. 1b wherein the horizontal jacking assembly is removed from the ground surface 8, then springs $92_a$ and $92_b$ would return piston rods $48_a$ and $48_b$ to a neutral position provided the hydraulic cylinders $82_a$ and $82_b$ are deenergized.

The vertical support means 130 which in the embodiments shown in the drawings comprises a pair of vertical jack assemblies 132 and 134 is shown in a more detailed form in FIG. 7. In this embodiment of the invention, vertical jacking assemblies 132 and 134 are identical so that the description of vertical jacking assembly 132 will serve as a description of vertical jacking assembly 134. With reference to FIG. 7, vertical jacking assembly 132 comprises an outer cylinder means 136, an inner cylinder or ram means 146 and a baseplate means 148. Outer cylinder means 136 comprises a mounting flange 137 which is fixedly attached to the underside 14 of pallet 10 and to internally threaded cylinder portion 138. The mounting flange 137 has a fluid input port 133 located therein which receives hydraulic fluid and supplies it to the interior of cylinder portion 138 between the top of inner cylinder means 146 and mounting flange 137. At the lower end of cylinder portion 138 is adjustable stop collar 139 which threadingly engages the threads on the interior of cylinder portion 138. Adjustable stop collar 139 may be adjusted by the manipulation of handles 149 attached thereto to change the length of travel of inner cylinder means 146. Also fixedly attached to mounting flange 137 is a spring bolt 141 which fixes spring 142 within the inner cylinder means 146 so that when there is movement of inner cylinder means 146 in the direction of arrow 143, spring 142 is compressed. The spring 142 then serves to return inner cylinder 146 to its retracted or raised position when pressurized fluid is no longer supplied to port 133.

The inner cylinder means 146 comprises an inner cylinder portion 147 mounted on baseplate means 148 by a universal-type connection 149. The universal connection 149 includes bearing shaft 150, secured to plate 151 by fastening means 152. Bearing shaft 150 supports spherical bearing 153 which is retained on thrust washer 154 by retaining ring 156. Spherical bearing 153 makes sliding pivotal contact with self-aligning bearing 157 fixed between retaining ring 158 and shoulder 159. The pivotal mounting 149 enables vertical jacking assembly 132 to accommodate nonparallelisms between the pallet 10 and the ground surface 8 in all directions.

The inner cylinder means 146 has a piston portion 162 secured at one end with sealing rings 164 and 166 fixed therein. The extent of travel of piston 162 along with inner cylinder portion 147 may be adjusted by moving adjustable stop collar 139. Stop plate 152 is threadingly engaged to cylinder portion 147 so it may be adjustably moved along inner cylinder portion 147 to change the range of movement on retraction of cylinder portion 147. Thus, the length of the downward stroke an the retraction stroke may be adjusted to accommodate various elevations and connecting situations.

Assuming vertical jack assembly 132 to be in the position shown in FIG. 1a, it may be operated by applying pressurized fluid to input port 133 which causes piston 162 along with the remaining parts of inner cylinder means 146 to move downwardly in the direction of arrow 143 until piston 162 abuts adjustable stop collar 139. Adjustable stop collar 139 is set to allow inner cylinder means 146 to move a distance adequate for baseplate means 148 to contact ground surface 8 and to raise horizontal jacking assembly 30 off ground surface 8. This movement of inner cylinder means 146 compresses spring 142 so that when the pressurized fluid is no longer supplied to input port 133, inner cylinder means 146 will automatically be returned to the position wherein piston 162 adjacent mounting flange 137 and stop plate 152. Movement in the direction opposite to arrow 143 results in the horizontal jacking assembly again contacting ground surface 8. In this manner, vertical jacking assembly 132 (and 134) serves to selectively support pallet 10 and any object placed thereon and to selectively transfer the load from itself to horizontal jacking assembly 30.

The manner of controlling a single module can be further understood by reference to FIG. 9 which shows such a control system in a schematic form. The control system may be broken up into two control functions. One function is a steering control function and the other is the advancing or transfer control function. The transfer control function is accomplished by transfer power source (e.g., pump with associated hardware) 180 which supplies fluid under pressure to transfer control means 182. Transfer control means 182 may be a valving arrangement including an automatic controller wherein operation of manual control means 184 results in fluid being supplied to conduits 188, 190 and 192 in a proper sequence so that movement of the pallet would occur in the direction indicated by arrow 6 on FIG. 1. For example, transfer control means 182 would first supply pressurized fluid to conduit 192 which is connected to the vertical jacking assemblies 132 and 134 to cause said cylinders to be extended and contact ground surface 8. Then, with the fluid pressure maintained on conduit 192, pressurized fluid would be supplied to conduit 190 which is coupled to a port (not shown) in cylinder 50 adjacent the end of the cylinder in proximity to piston rod $48_a$ resulting in the movement of the slide as shown in FIGS. 1b and 1c. The conduit 188 would during this period serve as a return line. When movement of the slide is complete, the supply of pressurized fluid to conduit 192 would be terminated and vertical jacking assemblies 132 an 134 would be retracted. When the retraction is completed, the pressurized fluid supply to conduit 190 is also terminated and pressurized fluid is supplied to conduit 188 which is coupled to a port (not shown) in the end of the cylinder 50 adjacent piston rod $48_b$ which causes the cylinder to slide over bearing means 56 as shown in FIG. 1e. During this movement, conduit 190 serves as a return line. In this manner, the transfer and movement of a module 20 is accomplished. It is apparent that the sequence of events could be readily altered to cause movement in the opposite direction.

To accomplish the steering function, steering power source 210 connected to steering valve means 212 are employed. The steering valve 212 which includes a manual control means 214 is connected to conduits 216 and 218 which are in turn connected to cylinders $82_a$ and $82_b$. Each of the conduits 216 and 218 are connected to both of these cylinders to operate the double acting cylinder arrangement. Thus, the conduit 216 simultaneously supplies fluid to the ends of cylinders $82_a$ and $82_b$ via ports (not shown) which would result in the piston rods of these cylinders causing a lateral translation of the piston rods $48_a$ and $48_b$, etc., in a particular direction. The conduits 218 simultaneously supplies fluid to other ends of cylinders $82_a$ and $82_b$ via ports (not shown) which would cause the piston rods therein to move so as to cause a translation of the piston rods $48_a$ and $48_b$ in the opposite direction. Thus by operating the manual control means 214 of the steering valve, pressurized fluid from steering power source 210 would be directed to either conduit 216 or 218 to cause steering movement in one direction or the other. The conduit that is not supplied with pressurized fluid operates as a return line. In this manner, the steering action of the module is accomplished.

It should be noted that both with respect to the transfer function and the steering function, the same transfer power source, transfer control, steering valve, and steering power source could be employed for any number of modules 20. These modules and their respective conduits would merely be plugged into the conduits 188, 190, 192, 216 and 218. This type of control system contributes to the generality of application of the invented system.

With the above-detailed description of the module in mind, FIG. 8 is referred to to show a typical way in which the modules may be connected to form a large pallet assembly suitable for moving such large objects as whole sections of ships. In this arrangement, the direction of movement of the pallet assembly is indicated by arrow 2 with the rectangles representative of the various units heretofore associated with the particular numbers. The solid lines interconnecting these modules are representative of the pallet structure. It should be noted that in this assembly of modules, not all the modules include steering means 80. It is, of course, possible to employ steering means on each and every module but in a large system such as that shown in FIG. 8, it would be more economical to do otherwise. Notwithstanding that steering means are not included in every module, steering may still readily be accomplished by employing a slightly modified concept of jointly controlling modules. In this modification, there is a steering valve and steering power source at the front 250 of the pallet construction and one at the rear 240 of the pallet construction. The steering means at the rear 240 would be controlled jointly and the steering means at the front 250 of the pallet would also be controlled jointly. The operating of the steering means on the rear to move in a first direction would essentially result in the whole pallet system tending to pivot on the ground surface about an axis perpendicular thereto. The operation of the steering controls at the front 250 result in a similar pivoting of the pallet system. It should be noted that to accomplish movement in the same direction, the steering means 80 mounted on the modules in the rear 240 would move piston rods $48_a$ and $48_b$ in one direction while the steering means 80 mounted on the modules at the front 250 would move piston rods $48_a$ and $48_b$ in an opposite direction. In the process of actually moving the ship, an operator may be located at the front of the pallet and another operator may be located at the rear of the pallet. Each operator would control the movement by operating the particular steering valves independently. Thus, it can be seen that modules 20 may be combined into pallet systems in various ways with steering means not required for each module.

In summary, from a review of the FIGS. 1 through 9, it can be seen that a module and system have been disclosed which is applicable to the movement of multiton objects over surfaces having no rails thereon. The system may be steered by relatively simple means. The modules may be combined to accommodate huge objects of varying sizes and weights. For example, in the building of ships a pallet assembly may be employed to fabricate separate sections of the ship and then the pallet assemblies may be steered into adjacent positions and the ship sections combined by joining the two pallet assemblies into one. Then this combined pallet assembly may be joined to other pallet assemblies to form a completed ship whereupon the entire pallet assembly may be moved adjacent to a body of water for launching.

The joining of modules and pallet systems is readily facilitated by the provision of elevation adjustment means in the horizontal and vertical jacking assemblies. In addition, movement over surfaces wherein the pallet is not parallel to the ground surface or where there are irregularities in said ground surface is facilitated by various pivoting means and cushions (e.g., urethane). Thus, adjustment about the pitch, roll and yaw axis are provided along with adjustment in the plane of transfer in the X and Y direction and for skew.

All of the modules combined into a pallet system may be controlled by a single control system. Throughout a pallet assembly, there is a commonality of the components. This facilitates the economics of the particular system. These are but a few of the advantages inherent in the module and system disclosed by the embodiments of the invention heretofore described.

An alternate embodiment of the invented system is shown in FIG. 10. This system employs vertical jacking assemblies 332 and 334, horizontal jacking assemblies 340 and 350. The horizontal jacking assembly 340 is pivotally connected to vertical jacking assembly 332 and vertical support member 360. Horizontal jacking assembly 350 is coupled between vertical jacking assembly 334 and vertical support 370. The support members 360 and 370 are rigidly attached to bearing member 380 which has pallet 390 affixed thereon.

Figure 10A:
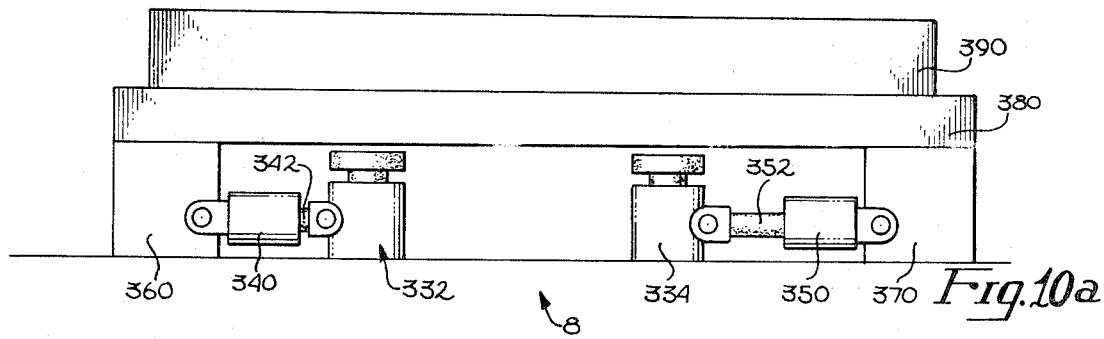
FIG. 10 a—d is a schematic representation of an alternate embodiment of the invention showing the system components in various positions as a cycle of operation is completed.
Figure 10B:
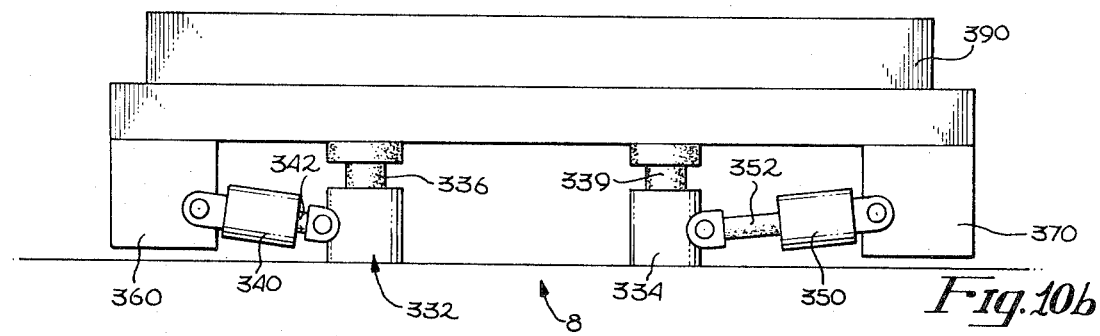
Figure 10C:
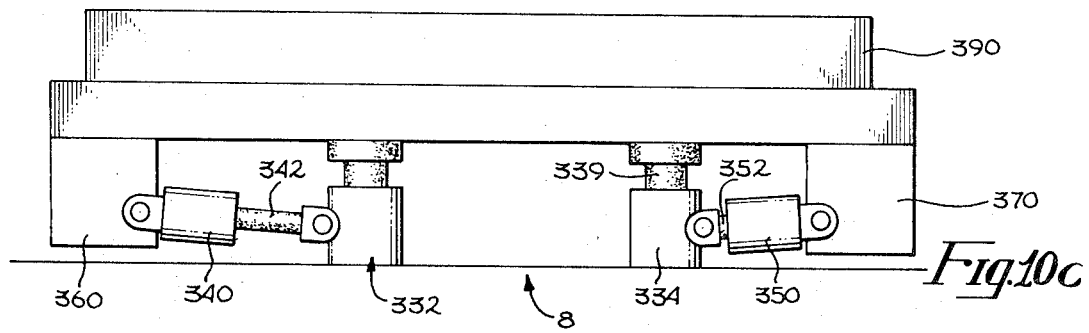
Figure 10D:
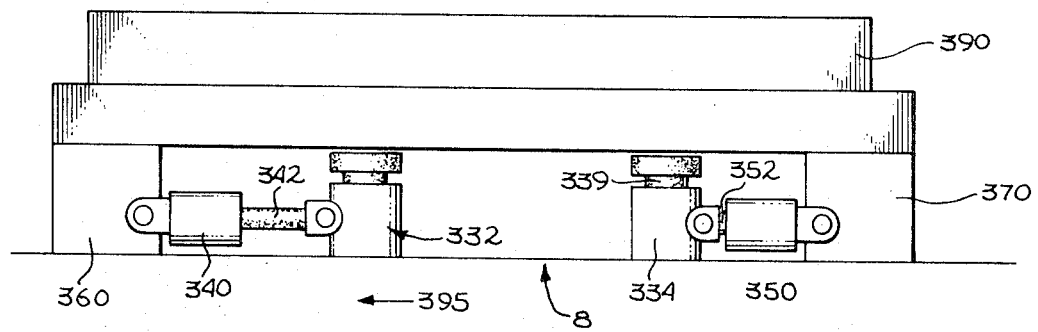

With the above general structure in mind, the sequence of operation of this system will be explained with reference to FIG. 10a through 10d for movement in the direction indicated by arrow 395. As seen in FIG. 10a, the pallet is supported on ground surface 8 by support members 360 and 370 with vertical jacking assemblies 332 and 334 retracted from bearing 380. Horizontal jacking assembly 350 has its piston rod 352 extended while piston rod 342 of horizontal jacking assembly 340 is retracted. With the components in this position, the next step in the operation is to extend piston rods 336 and 338 so that support members 360 and 370 are removed from ground surface 8 (FIG. 9b). With the components so positioned, pallet 390 is in position to be advanced. Pallet 390 is then advanced by piston rod 342 of horizontal jacking assembly 340 being extended while piston rod 352 of horizontal jacking assembly 350 is contracted. This results in bearing means 380 sliding over the top of vertical jacking assemblies 332 and 334, whereby pallet 390 is advanced as shown in FIG. 10c. Following this movement of pallet 390, the vertical jacking assemblies 332 and 334 are operated to retract piston rods 336 and 338 thereby lowering support members 360 and 370 to contact ground surface 8 (FIG. 10d). This removes the tops of vertical jacking assemblies 332 and 334 from contact with bearing 380. The horizontal jacking assemblies 340 and 350 may be again operated to assume the position shown in FIG. 10a. When this is done, the cycle will again be repeated and the movement will continue in the direction of arrow 395.

As to specific structural modifications, there are numerous possibilities. For example, housing 44 may be eliminated and plate 45 may be directly attached to cylinder 50 so that cylinder 50 transfers the load to bearing means 56. In this embodiment, the cylinder 50 may also form a pivotal bearing by being mated with a bearing means 56 having a circular configuration.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. a module for use in connection with the moving of multiton objects over a ground surface comprising:

a support surface member having an area for receiving at least part of said multiton object over said ground surface;

vertical support means for selectively supporting said surface member; and, selectively operated moving and support means for supporting said surface member and for moving said surface member over said ground surface, said moving means coupled to said support member and comprising:

an elongated structure having a bearing means for contacting said ground surface and an end plate proximate each end;

a cylinder having an axis extending along said elongated structure and coupled to said support surface; and, a piston rod in said cylinder, coupled to said end plates wherein said cylinder is fixedly coupled to said support surface and said piston rod is movably mounted in at least one of said end plates for movement at an angle to said axis of said cylinder and mounted fixedly within said end plate with respect to movement along said axis;

whereby said support surface may be readily moved over a surface.

2. The module defined in claim 1 wherein said vertical support means comprises a baseplate, a hydraulic means mounted on said baseplate and coupled to said support surface, said hydraulic means for extending and contracting between said ground and said support member.

3. The module defined in claim 1 including a steering means for moving said piston rod in at least one of said end plates.

4. The module defined in claim 3 wherein said steering means includes a cylinder means coupled to said piston rod for moving said piston rod.

5. The module defined in claim 4 including control means for operating said cylinder means during at least part of the period that said moving and support means is moving said surface member.

6. The module defined in claim 5 wherein said vertical support means comprises a baseplate, a hydraulic means mounted on said baseplate and coupled to said support surface, said means for extending and contracting between said ground surface and support member.

7. A system for moving a multiton object over a ground surface comprising:

a. a plurality of moving module means for receiving said object and for moving said object, each of said module means comprising:
  1. connection means for interconnection of one module means to another module means;
  2. vertical support means for selectively supporting said object;
  3. selectively operated moving and support means for supporting said object and for moving horizontally comprising an elongated structure having a bearing means for contacting said ground surface and end plates disposed at opposite ends of said structure, a cylinder having an axis extending along said elongated structure and a piston rod in said cylinder coupled to said end plate, said piston rod being movably mounted in at least one of said end plates for movement at an angle to said axis of said cylinder and mounted fixedly within said end plate with respect to movement along said axis; and b. control means for controlling a plurality of said vertical support means and said moving means for operating in unison, whereby said object may be readily moved over a surface.

8. The system defined in claim 7 wherein said control means controls said vertical support means and said moving means and operates in the following sequence:

a. vertical support means operates to support said object;
b. moving means operates to move horizontally; and
c. vertical support means operates to transfer support of object to moving means.

9. The system defined in claim 7 wherein at least three modules are employed.

10. The system defined in claim 9 wherein said vertical support means are hydraulic means.